June 2, 1953  E. FORCE  2,640,960
WELDING TRANSFORMER
Filed March 17, 1951
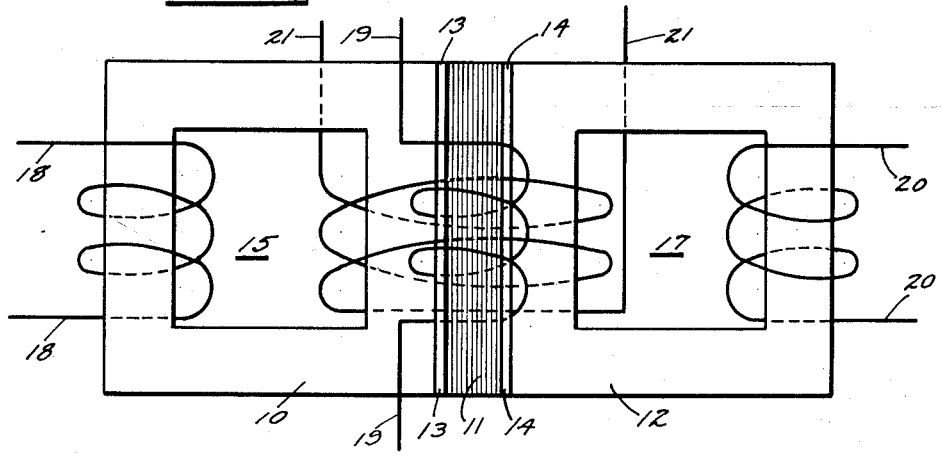
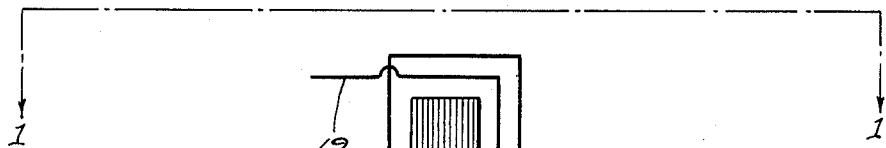
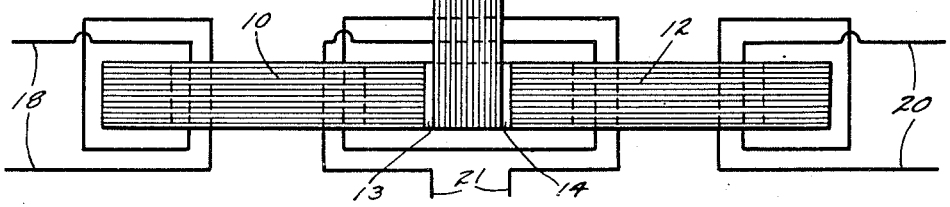
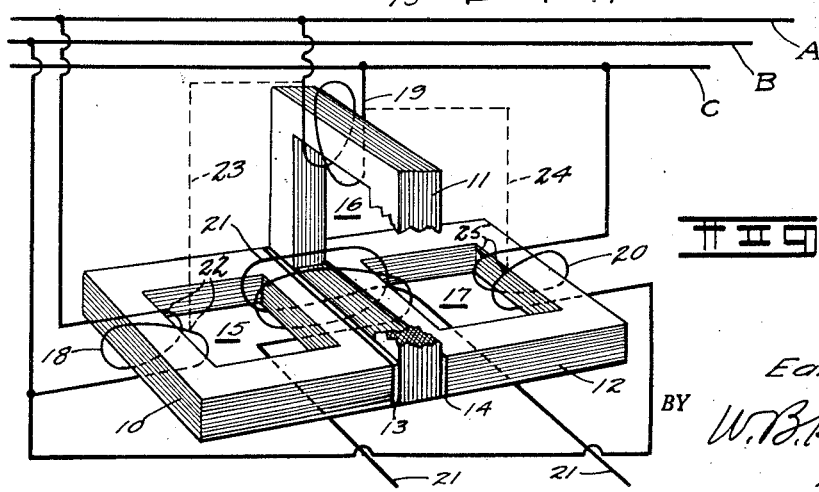
INVENTOR.
Earl Force.
BY
W. B. Harpman
ATTORNEY.

Patented June 2, 1953

2,640,960

UNITED STATES PATENT OFFICE 2,640,960

WELDING TRANSFORMER

Earl Force, Newton Falls, Ohio, assignor of fifty per cent to Webster B. Harpman, Poland, Ohio Application April 17, 1951, Serial No. 221,481

6 Claims. (Cl. 321—57)

This invention relates to a welding transformer and more specifically to a welding transformer suitable for operating a flash welding machine and balancing its load on all three phases of its power line.

The principal object of the invention is the provision of a welding transformer for producing 60 cycle, single phase secondary current from a three phase system, the primary load being equally distributed on each of the three phases.

A further object of the invention is the provision of a welding transformer forming a magnetic circuit having a reluctance enabling 60 cycle single phase current to be obtained therefrom without the disadvantage of having a magnetic short circuit during a portion of the cycle of phase rotation.

A still further object of the invention is the provision of a welding transformer capable of producing 60 cycle single phase secondary current from a three phase system with the primary load being equally distributed on each of the three phases and in which the magnetic circuit of the core material is worked below its saturation point.

The welding transformer disclosed herein forms a magnetic circuit through the grouping of three laminated cores, each of which has an associated primary circuit for energization and are so arranged that a secondary circuit interconnects the three cores by passing through windows formed in each of the same whereby an electromotive force is induced in the secondary circuit which will increase in value along a curve and be suitable for use in a welding machine.

The welding transformer disclosed herein makes possible the efficient use of a power distribution system and its generating capacity in connection with a welding machine by enabling the welding machine to spread its load equally on each of the three phases of the system. The advantages in the welding transformer disclosed herein will be apparent to those skilled in the art as it enables welding machines to be used without the heretofore believed necessary phase shifting as found in the prior art apparatus wherein reversing ignitrons act as electronic switches rapidly reversing the direction of a low frequency single phase alternating current and feeding the same into the primary of a welding transformer. On the contrary the present invention relates to a welding transformer which purposely breaks up the magnetic circuit between the three cores and the three primary windings and thereby enables a suitable single phase secondary current to be produced in the secondary winding which is partially disposed in each of the three cores as aforesaid. A welding machine such as a resistance welder or a flash welder may therefore be energized directly by the secondary of the transformer disclosed and the primaries of the welding transformer connected directly with a suitable three phase distribution system.

With the foregoing and other objects in view which will appear as the description proceeds, the invention resides in the combination and arrangement of parts and in the details of construction hereinafter described and claimed, it being the invention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of a welding transformer incorporating a schematic wiring diagram.

Figure 2 is a side elevation of the transformer shown in Figure 1 and incorporating a schematic wiring diagram.

Figure 3 is a perspective view of the welding transformer with portions broken away and incorporating a schematic wiring diagram.

By referring to the drawings and Figures 1 and 2 in particular it will be seen that the welding transformer comprises a grouping of three separate laminated core structures 10, 11 and 12, two of which, the cores 10 and 12, are positioned in longitudinal alignment with one another on a common horizontal plane and spaced with respect to one another by the intermediate positioning of a portion of the laminated core 11 which is also electrically insulated with respect thereto by insulating layers 13 and 14. The laminated core 11 is positioned vertically with respect to the horizontal positioning of the cores 10 and 12, as heretofore described, and at right angles thereto as will be best seen by referring to Figures 2 and 3 of the drawings.

The laminated cores 10, 11 and 12 are provided with windows 15, 16 and 17, respectively, and each of the outermost portions of the cores 10, 11 and 12, as defined by the windows 15, 16 and 17, is provided with a primary winding 18, 19 and 20, respectively. The primary winding 18 is connected to a three line power source carrying a three phase current as best illustrated in Figure 3 of the drawings and wherein the three lines are indicated by the reference characters A, B and C. By referring thereto it will be observed that the leads from the primary winding 18 are connected with the lines A, and B of the three line power source, that the primary winding 19 is connected with the lines A and C and the primary winding 20 is connected with the lines B and C. Those skilled in the art will recognize this as a delta connection and it will be obvious that a star or Y connection may alternately be used with respect to the manner of supplying energy to the windings 18, 19 and 20 of the welding transformer.

It will also be obvious to those skilled in the art that the primary windings 18, 19 and 20 may be provided with multiple taps and the connections with the lines A, B and C made through the taps as is well known in the art. In any event, the primary windings 18, 19 and 20 serve to create magnetic circuits in the cores 10, 11 and 12 and in direct relation to the vector rotation of the power source. The magnetic circuits established in the cores 10, 11 and 12 by the primary windings 18, 19 and 20 will thus be seen to be energized in time phase with respect to each other and, by reason of their arrangement with respect to one another, their total flux results in the production of the desired 60 cycle single phase secondary current.

The secondary current produced by the welding transformer is collected by a secondary winding 21 which is formed about the grouped innermost portions of the cores 10, 11 and 12 as defined by the windows 15, 16 and 17 and as best shown in Figure 2 of the drawings. The positioning of the secondary winding 21 about the adjacently positioned portions of the cores 10, 11 and 12 will thus be seen to be responsible for the production of a single phase current at the desired frequency as the fluxes in the cores 10, 11 and 12 are displaced 60 electrical degrees with respect to one another and a welding machine operating on the current supplied by the secondary winding 21 will be equally operated on each of the three phases and therefore meets the several objects of the invention.

Those skilled in the art will observe that the flux in the secondary 21 which is common to the primaries 18, 19 and 20 is additive and that the connection of the primaries 18, 19 and 20 with the power source, as shown in Figure 3 of the drawings, is different from that of a normally closed delta. The difference exists in the positioning and connection of the primary 19 with respect to the primaries 18 and 20 as the primary 19 is wound in the opposite direction with respect to the primaries 18 and 20 and so connected to the line.

Those skilled in the art will also note that the transformer disclosed herein has a further advantage over the prior art in that there is no danger of overloading one portion of the supply circuit as the entire device becomes inoperative if one phase is out. A further advantage in the transformer disclosed herein will be observed in that it can be used with conventional single phase control equipment as only one primary need be controlled in order to control the output of the transformer.

A modified form of the welding transformer herein disclosed may be formed of the same components by altering the wiring of the primary 19 so that rather than supplying the same from lines A and C, as disclosed in Figure 3 and hereinbefore described, it is supplied from taps intermediate the ends of the primary windings 18 and 20. Such an alternative wiring arrangement is illustrated in dotted lines in Figure 3 of the drawings and wherein one of a plurality of taps 22 on the primary winding 18 is connected by a conductor 23 with one end of the primary winding 19. The other end of the primary winding 19 is connected by a conductor 24 with one of a plurality of taps 25 on the primary winding 20. Under such conditions the connections of the primary 19 to the lines A and C, as shown in Figure 3, are eliminated and the primary 19 is supplied from the taps intermediate the ends of the primary windings 18 and 20.

The load on the transformer may be balanced by moving the conductors 23 and 24 energizing the primary 19 to others of the plurality of taps 22 and 25 on the primaries 18 and 20, respectively, and under such a wiring arrangement it will be observed that the primary 19 is supplied by energy from the primaries 18 and 20 which are located in the transformer 180 electrical degrees with respect to each other or in horizontal end to end alignment as shown in the several figures of the drawings.

This modification of the welding transformer herein disclosed will be seen by those skilled in the art to comprise an open delta winding with the primary 19 supplied by taps on the two legs of the delta circuit. It will further be seen by those skilled in the art that the power supply can be supplied by lines A and C and that the output of the secondary 21 will comprise desirable single phase current of the same cycle as the input of the lines A and C.

It will thus be seen that the transformer disclosed herein meets the several objects of the invention.

Having thus described my invention, what I claim is:

1. A welding transformer for transforming three phase alternating current into single phase alternating current of the same frequency and comprising three apertured cores, two of which are positioned in end-to-end relation and the third of which is positioned intermediate thereof and at right angles thereto, primary circuits about the outermost portions of each of the cores and a secondary circuit about the adjacent portions of said cores, one or more of said primary circuits connected in reverse relation with respect to the remaining primary circuits.

2. A welding transformer for transforming three phase alternating current into single phase alternating current and comprising three laminated windowed cores, two of which are positioned in longitudinal alignment with said laminations thereof in end-to-end relation, the third core being positioned at a 90 degree angle to the plane of the first mentioned cores and intermediate the ends thereof and electrically insulated with respect thereto, primary circuits formed one on each of the outermost arcuately spaced portions of the windowed cores and a secondary circuit about their adjacent innermost portions, one or more of said primary circuits connected in reverse relation with respect to the remaining primary circuits.

3. A welding transformer for transforming three phase alternating current into single phase alternating current and comprising three windowed laminated cores, primary circuits about portions of each of the cores, other portions of each of the cores being grouped together with a secondary circuit positioned thereabout, said cores being positioned with respect to one another so that two of the same lie on a horizontal line and the third lies on a tangent vertical line, one of said primary circuits connected in reverse relation with respect to the other two primary circuits.

4. The transformer set forth in claim 2 and further characterized by the electrical connection of the primary circuit about the intermediately positioned apertured core with taps on the primary circuits about the apertured cores positioned in end to end relation.

5. A transformer for transforming three phase alternating current into single phase alternating current and comprising three laminated windowed cores, two of which are positioned in 180 degrees relation to one another and the third of which is positioned intermediate thereof at 60 electrical degrees with respect to both of the first mentioned cores and electrically insulated with respect thereto, primary circuits formed one on each of the outermost arcuately spaced portions of the windowed cores and the primary circuit on the intermediate windowed core connected to the primaries on the other two cores at points thereon intermediate their ends, the primary circuits on said windowed cores positioned 180 degrees with respect to each other being connected to a suitable power source by a delta connection and a secondary circuit about the adjacent innermost portions of the three windowed cores.

6. A welding transformer for transforming three-phase alternating current into single phase alternating current of the same frequency and comprising three windowed cores arranged in a radial pattern about a common center point, primary circuits about the radially and circumferentially spaced portions of each of the cores, the opposite portions of each of the cores being grouped at said center point and a secondary circuit positioned thereabout, one or more of said primary circuits connected in reverse relation with respect to the remaining primary circuits.

EARL FORCE.

References Cited in the file of this patent

UNITED STATES PATENTS

| Number | Name | Date |
|---|---|---|
| 514,933 | Hunting | Feb. 20, 1894 |
| 535,010 | Hunting | Mar. 5, 1895 |
| 754,371 | Hutin et al. | Mar. 8, 1904 |
| 764,213 | Steinmetz | July 5, 1904 |
| 1,157,730 | Spinelli | Oct. 26, 1915 |
| 2,283,711 | Welch | May 19, 1942 |